E. A. LE FEVER.
METER PROTECTION DEVICE.
APPLICATION FILED JULY 25, 1913.
1,155,742.
Patented Oct. 5, 1915.
4 SHEETS—SHEET 1.
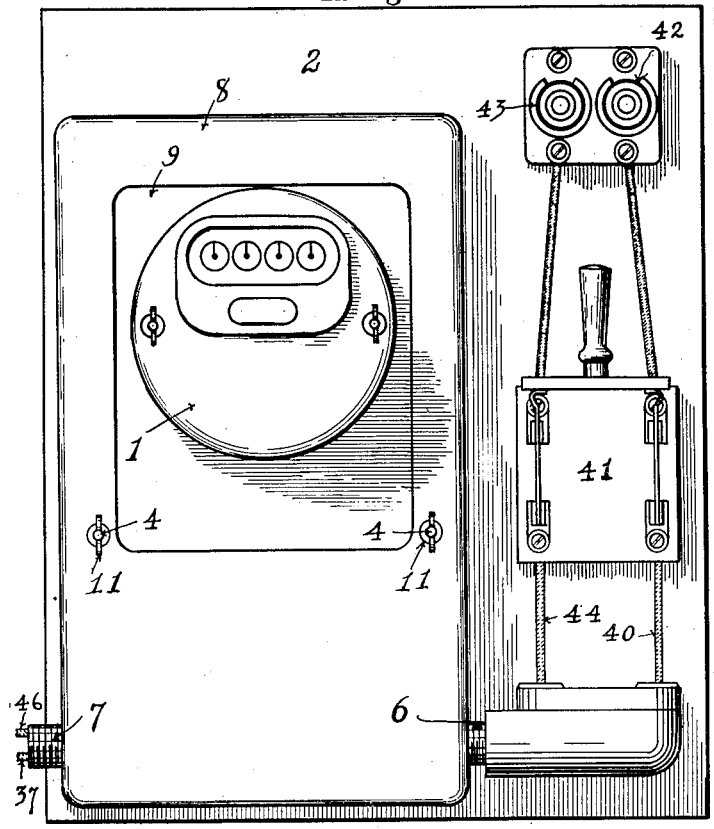
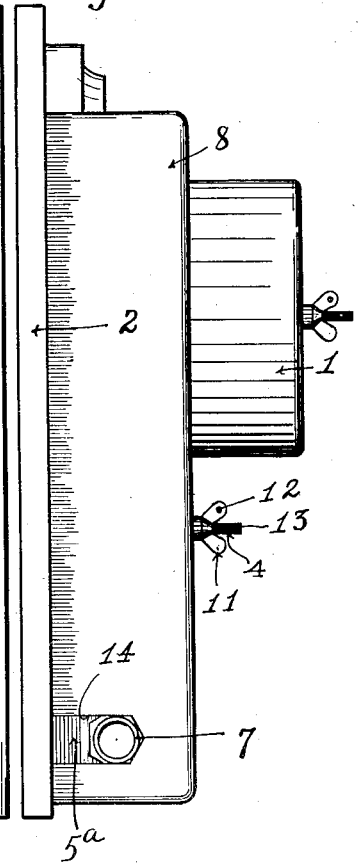
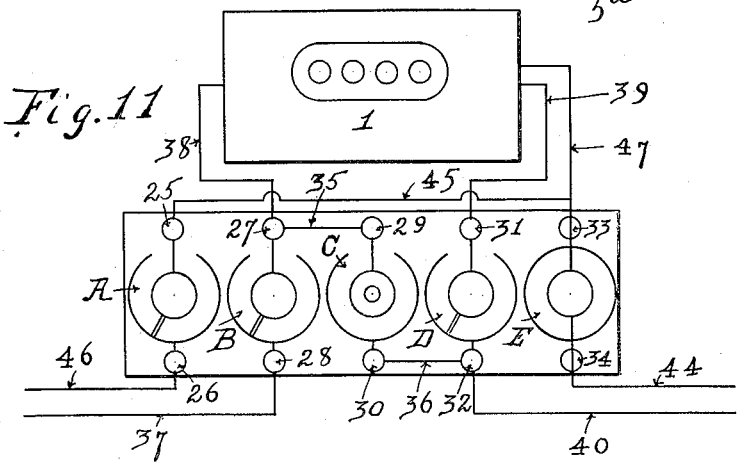
Witnesses:
A. W. Macomber
Abner J. Bowling
Inventor:
Earle A. LeFever
by Hn. Macomber,
Atty.

E. A. LE FEVER.
METER PROTECTION DEVICE.
APPLICATION FILED JULY 25, 1913.
1,155,742.
Patented Oct. 5, 1915.
4 SHEETS—SHEET 2.
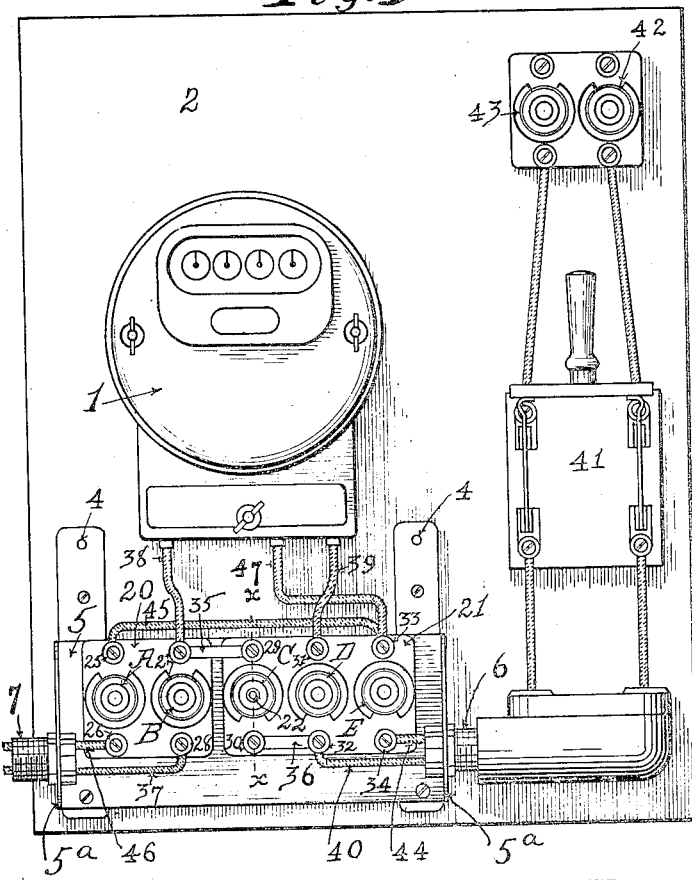
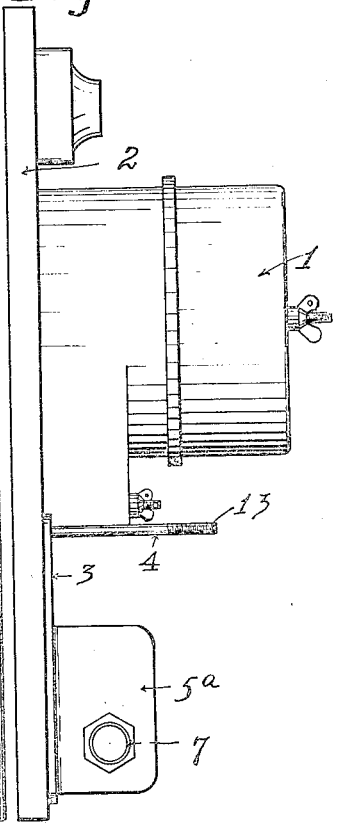
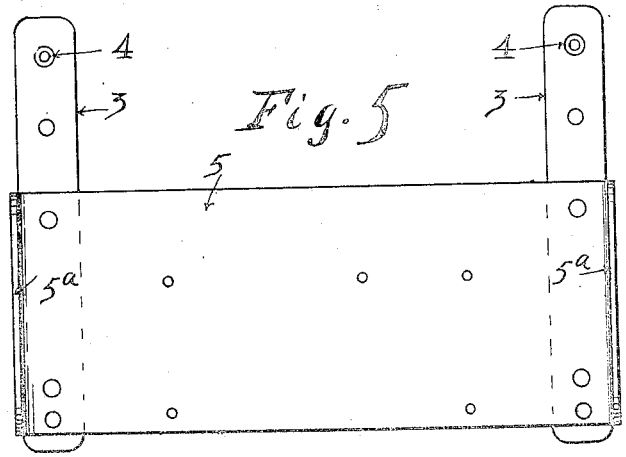
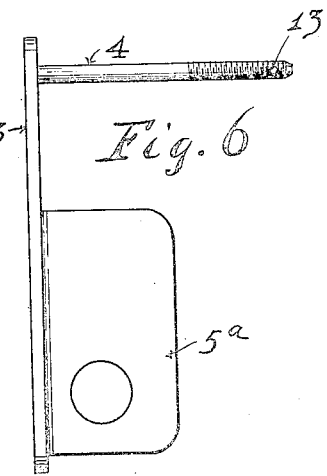
Witnesses:
Inventor:
Earle A. LeFever E. A. LE FEVER.
METER PROTECTION DEVICE.
APPLICATION FILED JULY 25, 1913.
1,155,742.
Patented Oct. 5, 1915.
4 SHEETS—SHEET 3.
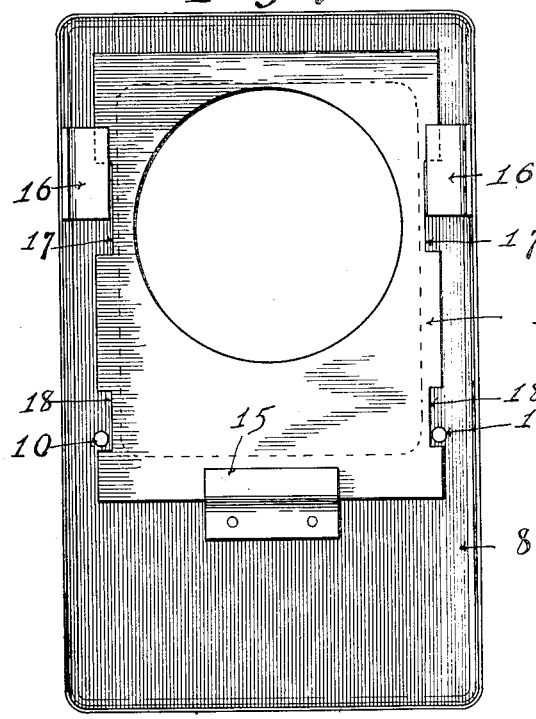
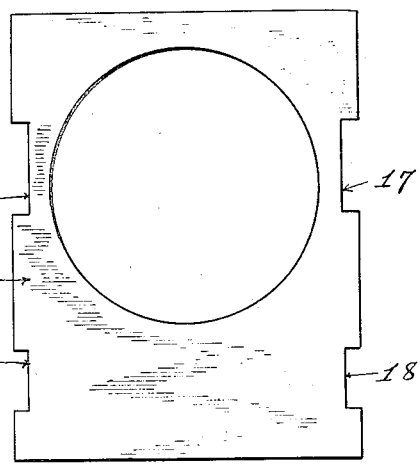
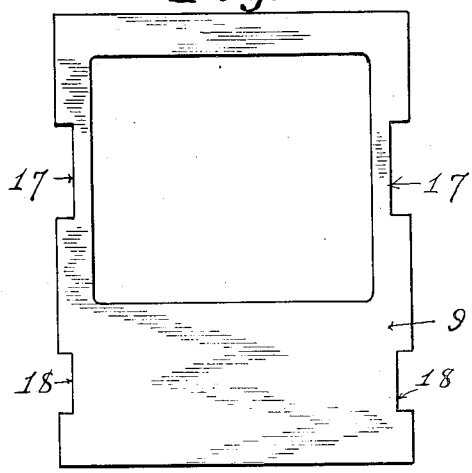
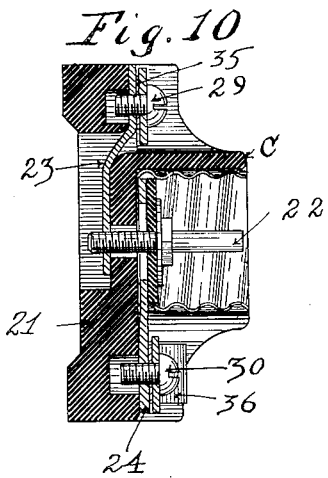
Witnesses:
A. W. Macomber.
Abner F. Bowling.
Inventor:
Earle A. LeFever
by H. W. Macomber,
Atty.

E. A. LE FEVER.
METER PROTECTION DEVICE.
APPLICATION FILED JULY 25, 1913.
1,155,742.
Patented Oct. 5, 1915.
4 SHEETS—SHEET 4.
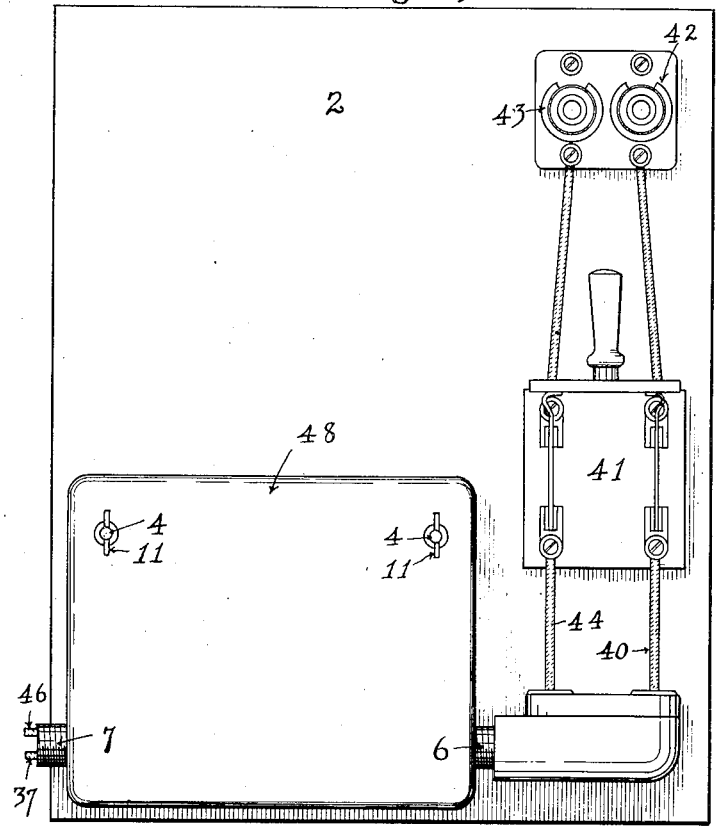
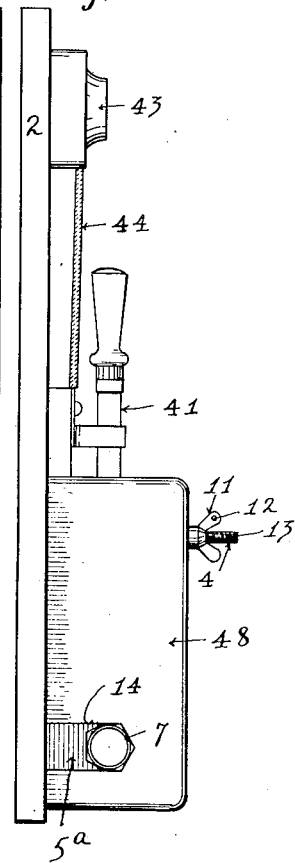
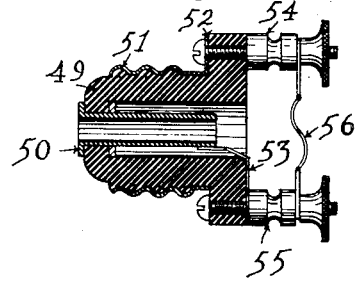
Witnesses:
A. W. Macomber
Abner J. Bowling
Inventor:
Earle A. LeFever
by H. W. Macomber,
Atty

UNITED STATES PATENT OFFICE.

EARLE ALBERT LE FEVER, OF BUFFALO, NEW YORK.

METER-PROTECTION DEVICE.

1,155,742.   Specification of Letters Patent.   Patented Oct. 5, 1915.

Application filed July 25, 1913. Serial No. 781,100.

*To all whom it may concern:*

Be it known that I, EARLE A. LE FEVER, a citizen of the United States, residing at Buffalo, in the county of Erie and State of New York, have invented a new and useful Improvement in Meter-Protection Devices, of which the following is a specification.

My invention relates to meter protection devices, and more particularly to protective means for meters and meter connections for measuring electric energy.

The object of my invention is to provide a simple and effective covering for the meter and its connections, so that current can not be stolen, so that the covering may be sealed against removal, so that the meter connections may be covered and sealed when the meter is removed and the switchboard is out of commission, so that the meter seal and the service-box seal are entirely independent of each other, and so that the protection device is readily adaptable to any interchange of style or form of meter cut-out and testing means whereby a person so authorized to do and provided with the proper means may test the meter at any time without interruption of service.

These and other features and objects of my invention will be more fully understood from the following specification and appended claims and from the drawings herewith, forming a part of the specification, in which like characters of reference indicate corresponding parts, in which,—

Figure 1 is a front elevation of my invention. Fig. 2 is a left-hand side elevation. Fig. 3 is a front elevation with the cover removed. Fig. 4 is a left-hand side elevation with the cover removed. Fig. 5 is a detail elevation on a larger scale of my base-plates and screw-studs and carrying plate for the cut-out apparatus. Fig. 6 is a side elevation of the same. Fig. 7 is an inside view of my cover. Fig. 8 is a face view of one form of my removable plate. Fig. 9 is a face view of another form of my removable plate. Fig. 10 is a section on the line $x$—$x$ of Fig. 3, on a larger scale. Fig. 11 is a diagrammatic view of my wiring and cut-out system. Fig. 12 is a section of one of my specially constructed plugs which I use in connection with the fuse-blocks, hereafter described. Fig. 13 is an elevation showing my means for protecting the meter connections when the meter is removed and the switch-board is out of commission. Fig. 14 is a left-hand side elevation of the same.

While I show and describe herein an improved cut-out and testing device, the same is more fully described and separately claimed in a division of this application filed January 2, 1914, Serial No. 809863.

A meter 1, of any desired type, is mounted in the usual manner upon a board or base 2. Secured to this base board are two base-plates 3, 3, and to these base-plates are secured upstanding screw-studs 4, 4, by means of which the cover is secured and sealed as hereafter described. To said base-plates 3, 3 is riveted a carrying plate 5, having upturned ends $5^a$, upon the face of which plate are mounted the fuse-blocks 20 and 21, and through the upturned ends $5^a$ are secured tubing nipples or conduits 6 and 7.

The cover 8 is a sheet metal box, open at the back and apertured upon its face for a removable face-plate 9, which face-plate is apertured to fit over the face of a meter. The cover 8 has holes 10, 10, through which the screw-studs 4, 4, pass. Wing-nuts 11, 11 are screwed down on the screw-studs 4, 4, and hold the cover 8 rigidly against the base 2. These wing-nuts have one wing drilled, as shown at 12 in Figs. 2 and 14, and each of the screw-studs is similarly drilled, as shown at 13, to receive a wire, the ends of which are sealed with a lead or other desired form of seal, thus preventing the nuts from being unscrewed. The sides of the cover 8 are apertured, as shown at 14 in Figs. 2 and 14, to pass over the nipples or conduits 6 and 7, and thus to cover or hold the nuts by which the said nipples or conduits are secured to the ends $5^a$ of the plate 5. As shown, this cover entirely incloses all parts of the meter except its face, and all of the meter connections, so that neither it nor its connections can be tampered with except by breaking the seals of the wing-nuts 11.

In the manufacture of devices of this character and in the use of the same in large numbers by concerns furnishing electric energy to consumers, it is of large economic importance that the construction shall be uniform and adaptable to any standard form of meter. This demand is met by the features of my invention specially shown in Figs. 7, 8 and 9.

As shown in full lines in Fig. 1 and in broken outline in Fig. 7, the cover 8 is apertured upon its face sufficiently large to admit the face or dial of any standard meter. Upon the inside of the cover 8 is a removable plate 9, which is apertured to fit closely over the face or dial of the form of meter to be used. The aperture may be of any desired form or size, as, for example, circular, as shown in Fig. 8, or rectangular, as shown in Fig. 9. This plate is removably secured to the cover in the following manner: Riveted to the inside of the cover 8 is a retaining lug 15, which is bent away from the inner surface of the cover and then bent upwardly parallel therewith to form a space or slot between its underside and the inside of the cover to receive the lower edge of the plate 9. Riveted to the sides of the cover are L-shaped lugs 16 to engage in like manner over the side edges of the plate 9. This plate 9 has notches 17 of such size and so positioned as to register with the lugs 16 when the plate 9 is slipped upwardly and out from under the lug 15. The positioning of these lugs 15 and 16 and the size of the plate 9 should be such that there is some side and vertical play when the plate is in the locked position to the end that the plate may readily center itself to the dial or face of the meter.

As a further protection which may or may not be employed against improper removal of the plate 9, notches 18 may be cut and so positioned as to register with the holes 10 in the cover 8 when the plate 9 is in the locked position and to be out of registration when the plate 9 is in the unlocked position. By the use of this second pair of notches 18 I may, instead of using the cover 48, hereafter described to protect the meter connections when the meter is removed, employ a non-perforate plate having the notches 17 and 18; and the screw-studs 4, 4, will in such case prevent removal of the plate when the cover is in place.

In this manner a plate 9 having the desired form of aperture may be inserted in any one of my standard covers by laying the plate in position where the notches 17 will register with the lugs 16, and then slipping the plate downwardly so that its lower edge engages under the lug 15, and the uncut edges will engage under the lugs 16. Thus placed, the notches 18 will register with the holes 10, and when put in place the plate will come to registration with the face of the meter and be securely locked against removal.

It will be evident that the lug construction may be varied in familiar ways, as, for example, by employing a keyhole and stud construction, or any other common form—the feature of this construction being retaining means on the inside of the cover which will hold the plate properly locked when centered and in place and which will permit release and interchange of plates when the cover is removed.

Referring now particularly to Figs. 3, 5, 10, 11, 12, my cut-out and testing device may be described. I bolt to the carrying-plate 5 two standard fuse-blocks 20 and 21. The block 20 has two standard poles A and B, and the block 21 has three poles, C, D and E, the pole D being standard and the poles C and E being modified as now described. The pole C has an outwardly-extending stud 22 which is electrically connected to the plate 23 which, in turn, is electrically connected to the binding-post 29, and the shell is electrically connected to the binding-post 30. In the pole E the insulation between the stud and shell is removed, so that the binding-posts 33 and 34 are in electrical connection when no plug is present—in fact, this pole acts simply as a binding-post, and is made in this form both for convenience of construction and for convenience in the use of my special plugs, hereafter described. The binding-posts 27 and 29 are electrically connected by a plate or wire 35, and the binding-posts 30 and 32 are similarly connected by a plate or wire 36. In the normal operating condition standard fuse-plugs are inserted in the poles A, B and D.

The apparatus just described and its method of operation is more fully explained, and is claimed, in my said application Serial No. 809863. And it is to be understood that the meter protection means herein described and claimed are not limited to use with any specific form of cut-out or testing means.

In the commercial use of electric energy it is common occurrence that service will be discontinued and the meter removed. And it is also common occurrence that either the same or another occupant of the premises may wish service at some future time. It therefore becomes desirable to leave the switch-board and meter connections in place, provided only the same may be properly protected. By my constructions and the manner of mounting the same I am able to attain this end by the use of a non-apertured plate 9, as heretofore described; or I attain this end by the use of a special cover, such as is shown in Figs. 13 and 14, which I will now describe. The regular cover 8 and the meter having been removed, I use the special cover 48, shown in these figures. As seen, it is similar in construction to the regular cover, being of sufficient size to cover the meter connections and to engage over the screw-studs 4 and apertured to engage over the nipples 6 and 7, the same as a regular cover. As this cover has no aperture upon its face, it affords complete protection to the meter connections and complete protection against theft of current while service is suspended and the meter removed.

I am aware that the generic principles of meter protection means are very old in the art; and I do not, therefore, claim the same broadly; but I do claim the following:—

1. In a meter protection device, in combination with a meter and a base, electrical connections mounted upon said base, a cover for inclosing said connections and said meter and apertured to fit over the face of said meter, screw-studs rigidly secured to said base independently of the meter casing and independently of the electrical connections within the area inclosed by said cover, nuts for securing said cover to said base and means for sealing said nuts.

2. In a meter protection device, in combination with a meter and a base, electrical connections mounted upon said base adjacent to said meter, a cover for inclosing said connections and said meter consisting of a box having an open back and apertured face to fit over the face of said meter and openings in said face to receive fastening and sealing means, rods secured to said base within the area inclosed by said cover and independent of the meter casing and passing through said openings in said cover, and securing and sealing devices on said rods.

3. In a meter protection device, in combination with a meter and a base, plates secured to said base and upstanding screw-studs secured to said plates, a carrying plate secured to said base-plates, electrical connections mounted upon said carrying plate, a cover for inclosing said electrical connections and said meter and apertured to fit over the face of said meter and nuts on said screw-studs for securing said cover to said base.

4. In a meter protection device, in combination with a meter and a base, plates secured to said base, a carrying plate secured to said plates having upturned ends to receive the nipples of the incoming and outgoing conduits, nipples secured thereto, electrical connections mounted upon said carrying plate, a cover for said meter and said connections apertured to fit over the face of said meter and apertured for said nipples, and means rigidly secured within the area inclosed by said cover to said base for securing said cover to said base.

5. A meter protection device comprising a base-board for supporting a meter and its electrical connections, a cover for inclosing the meter with the exception of the dial and for inclosing said electrical connections, said cover having holes for screw-studs, plates rigidly secured to said base-board within the area inclosed by said cover and independent of the meter casing, upstanding screw-studs secured to said plates and sealing nuts for securing said cover in place.

6. A meter protection device comprising a base-board for supporting a meter and its electrical connections, a cover having holes for screw-studs and for conduit nipples for inclosing the meter with the exception of the dial and for inclosing said electrical connections, plates rigidly secured to said base-board within the area inclosed by said cover and independent of the meter casing, upstanding screw-studs rigidly secured to said plates, a plate mounted upon said first-mentioned plates for carrying the electrical connections having upturned ends for conduit nipples, and wing-nuts on said studs for securing and sealing the cover.

7. A meter protection device comprising a base-board for supporting a meter and its electrical connections, a cover having holes for screw-studs and for conduit nipples and lugs for holding a face plate, a removable face plate to fit over the meter dial, plates rigidly secured to said base-board within the area inclosed by said cover, upstanding screw-studs rigidly secured to said plates and nuts therefor for holding and sealing the cover, and a plate mounted upon said stud-carrying plates for carrying said electrical connections having upturned ends for conduit nipples, conduit nipples secured thereto, said upturned ends being positioned within said cover adjacent to its side walls.

8. In a meter protection device, in combination with a base for carrying a meter and electrical connections for a meter mounted upon said base, protective means for said electrical connections when the meter is removed comprising plates secured to said base, screw-studs secured thereto, a cover for inclosing said electrical connections apertured for the incoming and outgoing conduits and nuts for said screw-studs.

9. In a meter protection device of the type described, a cover apertured upon its face to receive a plate apertured to fit about the face or dial of a meter, a removable plate to so fit about the face of a meter and lugs for locking said plate to said cover when the same is in place to fit over said meter.

10. In a meter protection device of the type described, a cover apertured upon its face to fit over any standard form of meter, means for securing said cover to the base carrying the meter, a removable plate adapted to fit a specific type of meter, means for removably securing the same to said cover whereby said plate is locked within said cover when in place over the meter and whereby, when said cover is removed from said meter, said plate may be removed and a plate differently apertured substituted to fit another type of meter and means for securing both the cover and the plate in the locked position over a meter.

11. In a meter protection device, a meter structure including connections and having a dial portion projecting forwardly therefrom, a cover for inclosing the meter structure and connections and provided with an opening larger than said dial portion, a set of plates each having an opening shaped to fit about the dial portion of one type of meter and having maximum dimensions slightly in excess of the size of the opening in said cover to be assembled therewith from the rear, and means for securing said cover in place over said meter structure and against undetected removal.

12. In a meter protection device, a meter structure including connections and having a dial portion projecting forwardly therefrom, a cover for inclosing the meter structure and connections and provided with an opening larger than said dial portion, a set of plates each having an opening shaped to fit about the dial portion of one type of meter and having maximum dimensions slightly in excess of the size of the opening in said cover to be assembled therewith from the rear, supports on the inside of said cover for said plates, and means for securing said cover in place against undetected removal.

13. In a meter protection device, a meter structure including connections and having a dial portion projecting forwardly therefrom, a cover for inclosing the meter structure and connections and provided with an opening larger than said dial portion, a plate having an opening shaped to fit about the dial portion of one type of meter and having maximum dimensions slightly in excess of the opening in said cover to be assembled therewith from the rear, and means for securing said plate and cover in place with respect to the meter structure to inclose the same and against undetected removal.

14. In a meter protection device, a meter structure having a dial and including a base, a plate secured to said base and meter connections mounted on said plate, a cover for inclosing the meter structure, plate and connections, and provided with an opening larger than said dial, a plate having maximum dimensions slightly in excess of the size of the opening in said cover to be assembled from the rear thereof adjacent said opening, and means mounted on said first-mentioned plate and extending through said cover for locking said cover and last-mentioned plate against undetected removal.

15. In a meter protection device, a meter structure having a dial portion projecting therefrom, a cover for inclosing the meter structure and provided with an opening to fit about the said dial portion, substantially as described.

Signed in the presence of two witnesses.

EARLE ALBERT LE FEVER.

Witnesses:
  NELSON B. PHILLIPS,
  FRANK E. BOWES.